Nov. 22, 1927.
E. L. MARTIN
1,650,142
ACCELERATING ALTERNATING-CURRENT MOTOR
Filed April 22, 1924    2 Sheets-Sheet 1
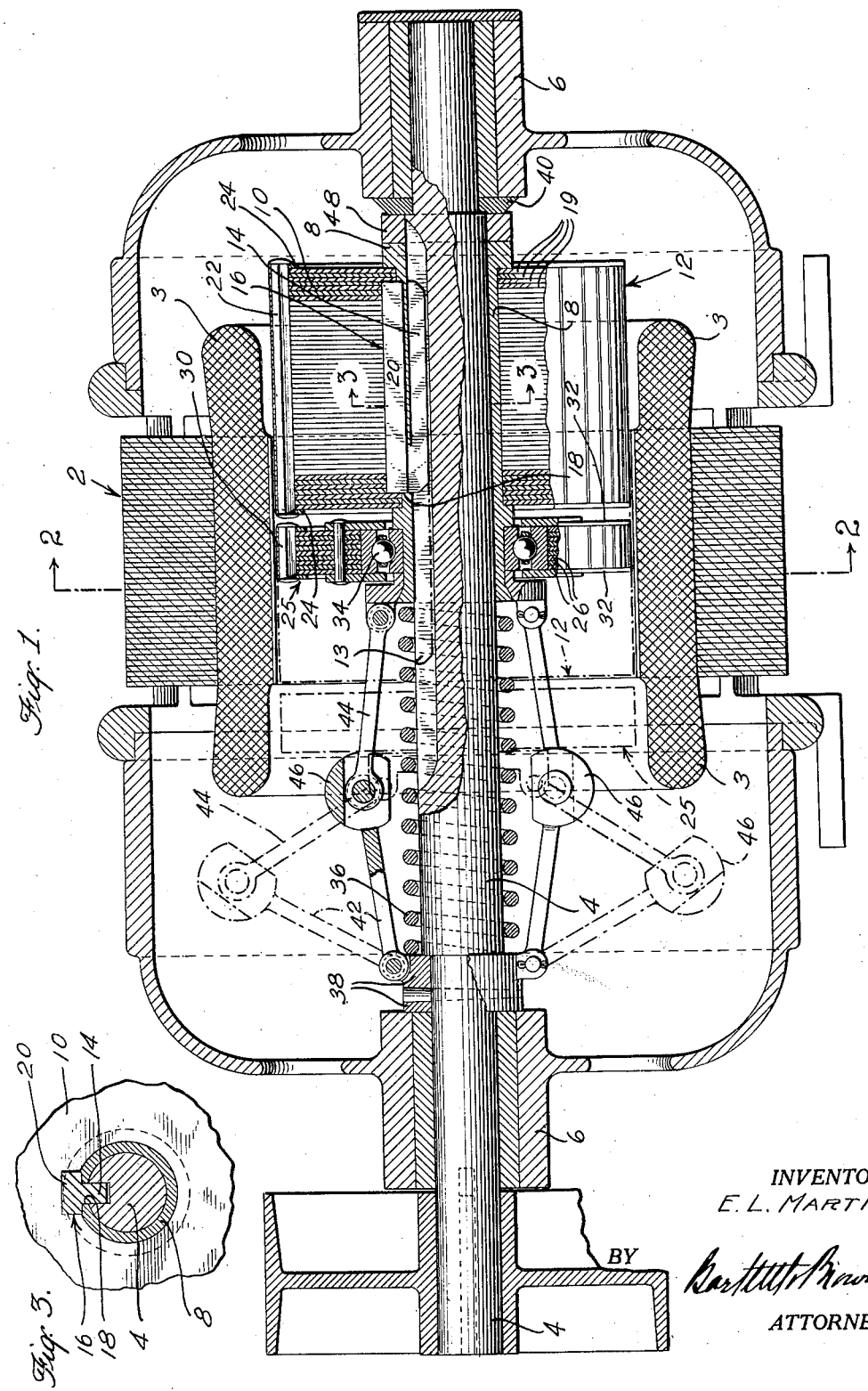
INVENTOR
E. L. MARTIN.
BY
ATTORNEYS Nov. 22, 1927.
E. L. MARTIN
ACCELERATING ALTERNATING CURRENT MOTOR
Filed April 22, 1924   2 Sheets-Sheet 2
1,650,142
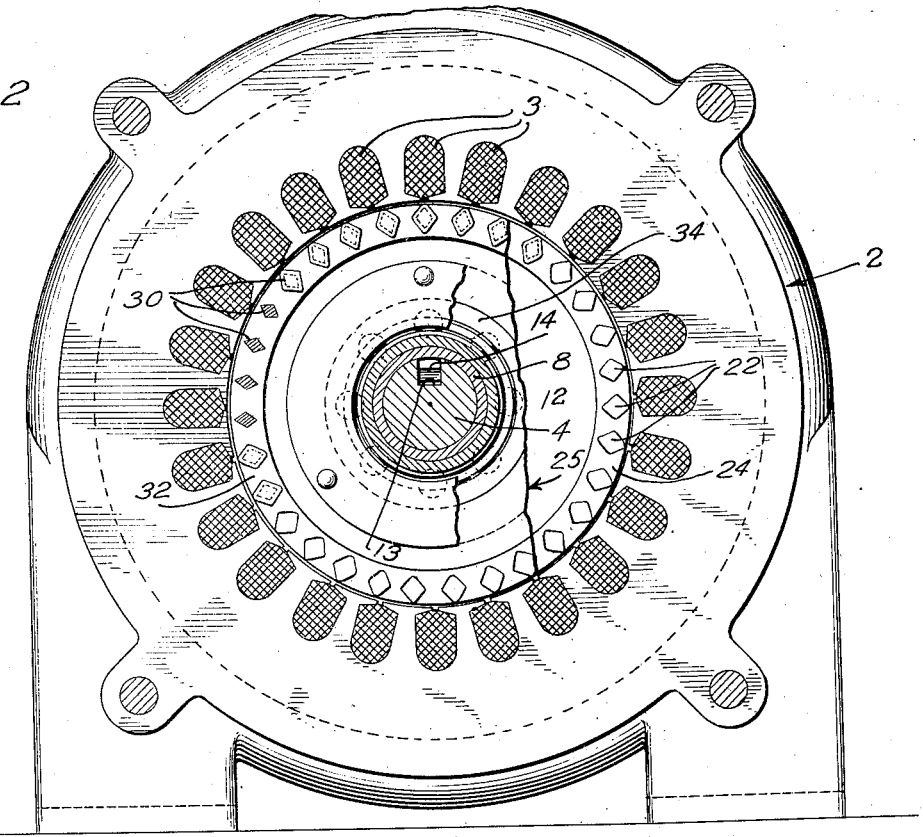
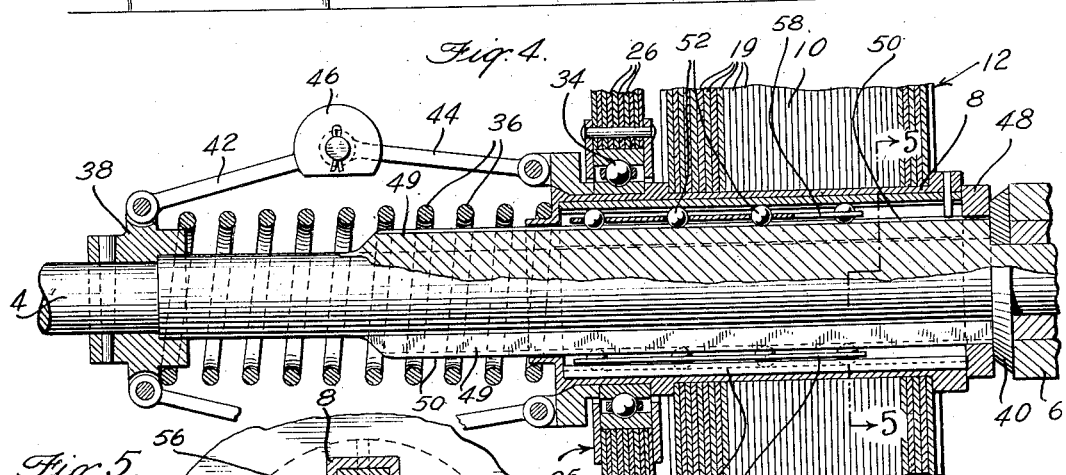
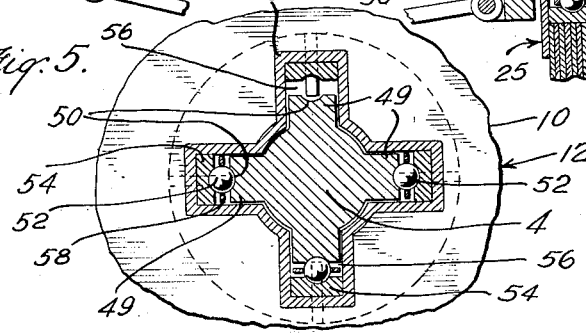
INVENTOR
E. L. MARTIN.
BY
ATTORNEYS Patented Nov. 22, 1927.

1,650,142

UNITED STATES PATENT OFFICE.

EARL LEONARD MARTIN, OF MIAMI, FLORIDA, ASSIGNOR TO C. L. BROWN, OF MIAMI, FLORIDA.

ACCELERATING ALTERNATING-CURRENT MOTOR.

Application filed April 22, 1924. Serial No. 708,115.

My invention relates to polyphase induction motors and has for its object to produce a self-accelerating motor of that type.

Another object of my invention is to produce a new and improved means of accelerating an alternating current motor having a closed induced circuit in which the change in speed is gradual as distinguished from being step by step.

Another object of my invention is to provide a new and improved means for varying the starting torque of my accelerating induction motor.

The polyphase induction motor has many adantages on account of its simplicity, the rotor being of the squirrel cage type and having neither external nor internal controlling resistances, but such motors as heretofore constructed have been adapted to be operated only under conditions where the rotor can revolve at full speed immediately upon the throwing of the switch, since induction motors, as heretofore constructed, have the characteristics requiring such immediate full speed upon starting. With my invention, however, the motor speeds up gradually until it attains full speed and thus is available for many uses for which induction motors heretofore made were not adapted.

The following is a description of an embodiment of my invention, reference being had to the accompanying drawings, in which, Fig. 1 shows my motor in longitudinal vertical section;

Fig. 2 is a transverse section on the line 2—2 Fig. 1;

Fig. 3 is a detail section on line 3—3, Fig. 1;

Fig. 4 is a partial longitudinal vertical section through the rotor, showing a modified form for motors of large size; and Fig. 5 is a transverse section on the line 5—5, Fig. 4 on an enlarged scale.

Referring more particularly to the drawings, 2 represents the stator of a polyphase motor, such for instance as the stator of a three-phase four-pole induction motor of standard construction and winding. 3 represents the stator windings. 4 is a rotor shaft mounted in suitable bearings 6 and having mounted thereon a sliding sleeve 8 upon which the laminated iron core 10 of the torque-producing or working rotor 12 is mounted. The shaft in the form shown in Fig. 1 is provided with a longitudinal groove 13 into which projects the center lug 14 of a dutch key 16. This key passes through a corresponding slot 18 in the sleeve, the head of the dutch key forming a spline 20 engaging recesses in the central laminated plates 19 forming the core of the rotor. The laminated plates 19 upon each end of the rotor have plain perforations which closely fit the surface of the sleeve 8. The working rotor is thus anchored to the sleeve 8 and shaft 4 against roation relatively thereto, while free to move longitudinally relatively to the shaft. It is provided at its periphery with the conductors 22 having their ends electrically connected together, preferably by copper rings 24, so as to constitute the ordinary closed circuited conducting squirrel cage of the induction type of rotor. The conductors 22 are acted upon inductively by the stator field and act mechanically to hold the laminations of the core 10 together.

Mounted between the stator poles when the motor is at rest is a non-torque-producing magnetic bridge 25 in the form of a disk composed of iron laminations 26, which bridge, when between the stator poles, acts as a shunt around the anchored working rotor 12 for a large proportion of the lines of force between the poles of the stator when energized. The effect of this bridge 25 is to reduce the effect of the inductive action of the stator field upon the anchored working rotor so that the rotor when slowly accelerating up to speed will have induced therein a current much less than the current induced at starting in the corresponding rotor of induction motors as now constructed. This bridging in conjunction with the axially movable anchored motor 12 which is magnetically drawn into the field of the stator of an automatic accelerating motor is, I believe, an entirely new idea. It may be embodied in various ways. I prefer, however, and it probably, from a practical standpoint, is necessary to make it in the form of laminated iron disk. I also prefer to mount it on the axially movable sleeve 8. I also prefer to mount it so as to be freely rotatable relatively to the shaft and to the anchored rotor. I also prefer to provide it with means for causing it to rotate approximately synchronously with the magnetic field immediately upon the closing of the motor switch.

The laminated construction and free rotation result in lowering of the iron losses in the bridge 25 so as to reduce the heating and increase the efficiency. The bridge, when freely rotatable, as is preferred, I term a "free rotor". As shown, it comprises iron laminations or plates forming a core whose periphery is provided with conductors 30 whose adjacent ends are connected together electrically, preferably by copper rings 32, so as to form upon this bridge a closed circuited conducting system of the squirrel cage type. This free rotor is preferably provided with an anti-friction bearing 34 composed of a raceway rigidly connected to the sleeve and a second raceway which carries the laminated plates 26 and interposed balls. The bridge as thus constructed and mounted assumes approximately synchronous speed immediately upon closing of the motor switch and this approximately synchronous speed still further reduces the iron losses therein.

Surrounding the shaft is a spring 36, one end of which bears against a suitable collar or thrust bearing 38 and the other end of which bears against the opposed end of the sleeve 8, tending to move the sleeve so as to hold its opposite end against a stop comprising the collar or thrust bearing 40 so that at starting the free rotor or bridge 25 lies between the poles of the stator and the anchored rotor 12 is displaced relatively to said poles so as to lie partially outside of the stator. In practice I have at least about one-fifth of the anchored rotor lying between the poles of the stator while the forward face of the free rotor is at approximately the center of the polar faces so that a substantial portion of the faces of the stator poles is uncovered by said rotor. Between the thrust bearing 38 and the sleeve 8 I preferably provide centrifugal devices composed of links 42 and 44 carrying weights 46 as in the ordinary centrifugal governor, which when the shaft is revolving act to move the sleeve 8 in opposition to the spring 36.

In operating the motor, the switch controlling the stator circuits is thrown in the ordinary manner connecting the stator in circuit so as to set up what is known as a rotating field. This acts upon the bridge 25 and upon the anchored rotor with the result that the bridge, when in the form of a free rotor, immediately begins to revolve in substantial synchronism with the field. This free rotor, when revolving in substantial synchronism, is practically devoid of eddy currents and other iron losses and has generated therein only such current as is necessary to maintain it in substantial synchronism. The anchored rotor then automatically starts and gradually accelerates. The free rotor or bridge affords a path for a large proportion of the lines of force between the poles of the stator, the remaining lines of force passing through the anchored rotor and acting inductively upon the conductors therein. These remaining lines of force, acting upon the anchored rotor conductors, produce torque in the anchored rotor, causing it to start slowly and to gradually accelerate, and at the same time act upon the anchored rotor to draw it, together with its sleeve and the free rotor, along the axis of the shaft until the anchored rotor is drawn by magnetic force into the stator in opposition to the spring 36. This is a solenoid action and is due to the fact that the face of the free rotor, remote from the working rotor, is withdrawn from the corresponding side of the stator for a considerable distance toward the other side of the stator, the free rotor being of such thinness as to permit such relation when the working rotor is partially withdrawn from within the stator. The centrifugal devices as the motor speeds up also tend to draw the anchored rotor into the stator until the anchored rotor is drawn fully within the stator and the free rotor, or bridge, is withdrawn therefrom, at which time the rotor will have reached its normal running speed and the motor will be acting efficiently as an induction motor of the ordinary type.

If it is desired to vary the starting torque of the motor, I change the effect of the thrust collar 40 by removing the spacing ring 48, or by introducing a wider spacing ring between the sleeve 8 and the right hand thrust collar 40, which changes will respectively decrease and increase the portion of the anchored rotor lying within the stator when at rest and adjust the starting torque when the current is thrown on to the stator the ring 48 constituting a changeable stop.

The free rotor, or bridge, by providing a free path for the lines of force at the start and during the accelerating of the anchored rotor, builds up at once such a counter-electromotive force in the stator windings as to relieve the anchored rotor of the full action of the rotating field of the stator, in this way automatically keeping down the current generated in the anchored rotor at the start and permitting that rotor to speed up gradually. As it speeds up and enters the stator field it functions more and more in producing the counter-electromotive force of the motor. The function of the bridge member in that regard simultaneously decreases to a corresponding amount, until the counter-electromotive force of the motor is largely, if not entirely, due to the action of the anchored rotor alone, running in approximate synchronism, this being the condition for effective operation of an induction motor.

This motor, when properly designed, can be reversed when running at full speed, at least under fair load, by throwing the controlling switch so as to reverse the direction of the stator field, the action being to stop the free rotor immediately and to thereafter immediately revolve the free rotor in substantial synchronism in the opposite direction. The spring, together with the repulsive action of the stator field, has meantime acted to expel the anchored rotor partially from the stator and draw the free rotor into its initial position. The anchored rotor then comes to rest, whereupon the accelerating action heretofore described is repeated, the anchored rotor gradually speeding up in the opposite direction.

For larger types of motor I prefer, instead of using the groove 13 and key 16, to form splines 49 upon the rotor shaft extending entirely through and beyond the sleeve which carries the rotor and to provide the outer faces of the splines with raceways 50 for balls 52, the inner surface of the sleeve being formed with corresponding raceways 54 and the sleeve itself being recessed so as to enclose the balls and the splines, as shown at 56 in Figs. 4 and 5. The balls on the splines are preferably provided with spacers 58. With this construction the free and enclosed rotors with their sleeve are moved more easily upon the shaft by the longitudinal pull of the stator and the action of the spring 36, the friction being reduced, which is highly desirable in motors in which the rotors are of considerable weight.

The action of the stator in drawing the anchored rotor within it corresponds somewhat to that of the ordinary solenoid upon its core.

This motor is particularly useful where it is necessary to frequently start and stop a motor under load or to start, stop and reverse, such for instance as in motors used for operating elevators, printing presses, general shop practice and the like, where any intermittent duty is necessary, and my invention enables induction motors with their advantages to be used for such purposes.

As will be evident to those skilled in the art, my invention permits of various modifications without departing from the spirit thereof or the scope of the appended claims.

What I claim is:

1. In a polyphase induction motor a stator having polyphase energizing windings, a rotatable shaft, a closed-circuited rotor and a non-working magnetic bridge, both mounted on said shaft and movable along its axis in one direction to a position where the faces of the poles of the stator are partially uncovered by said rotor and bridge and said rotor is partially out from between said faces, and movable in the other direction to a position where said rotor substantially covers said faces and said bridge is substantially out from between them, said rotor being anchored to said shaft so as to revolve therewith, and means tending to move said rotor and bridge to said first mentioned position and acting to do so when said stator is deenergized so that said motor can be started and reversed by currents in said energizing windings.

2. In a polyphase induction motor a stator having polyphase energizing windings, a rotatable shaft, a closed-circuited rotor and a non-working magnetic bridge, both mounted on said shaft and movable along its axis in one direction to a position where the faces of the poles of the stator are partially uncovered by said rotor and bridge and said rotor is partially out from between said faces, and movable in the other direction to a position where said rotor substantially covers said faces and said bridge is substantially out from between them, said rotor being anchored to said shaft so as to revolve therewith, and means tending to move said rotor and bridge to said first mentioned position and acting to do so when said stator is deenergized so that said motor can be started and reversed by currents in said energizing windings, said magnetic bridge being free to revolve relatively to said rotor and provided with a closed circuited conductor.

3. In a polyphase induction motor a stator having polyphase energizing windings, a rotatable shaft, a closed-circuited rotor and a non-working magnetic bridge, both mounted on said shaft and movable along its axis in one direction to a position where the faces of the poles of the stator are partially uncovered by said rotor and bridge and said rotor is partially out from between said faces, and movable in the other direction to a position where said rotor substantially covers said faces and said bridge is substantially out from between them, said rotor being anchored to said shaft so as to revolve therewith, and means for moving said rotor and bridge to said first mentioned position and acting automatically to do so when said stator is deenergized so that said motor can be started by currents in said energizing windings, said magnetic bridge being free to revolve relatively to said rotor and provided with a closed circuited conductor.

EARL LEONARD MARTIN.